(12) United States Patent
Savuoja

(10) Patent No.: US 6,577,619 B2
(45) Date of Patent: *Jun. 10, 2003

(54) PACKET TRANSMISSION IN MOBILE TELECOMMUNICATIONS SYSTEMS

(75) Inventor: Arto Savuoja, Oulu (FI)

(73) Assignee: Nokia Corporation, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,968
(22) PCT Filed: Mar. 26, 1998
(86) PCT No.: PCT/FI98/00272
§ 371 (c)(1),
(2), (4) Date: Oct. 29, 1998
(87) PCT Pub. No.: WO98/44685
PCT Pub. Date: Oct. 8, 1998

(65) Prior Publication Data
US 2002/0075820 A1 Jun. 20, 2002

(30) Foreign Application Priority Data
Mar. 27, 1997 (FI) .................................... 971319

(51) Int. Cl.[7] .................................................. H04J 3/24
(52) U.S. Cl. ...................................................... 370/349
(58) Field of Search ................................. 370/312, 321, 370/324, 326, 328, 329, 330, 336, 337, 338, 345, 346, 347, 348, 349, 350, 352, 458, 459, 522, 517, 528, 529

(56) References Cited

U.S. PATENT DOCUMENTS

| 4,672,608 | A | * | 6/1987 | Ball et al. | 370/346 |
| 5,295,138 | A | * | 3/1994 | Greenberg et al. | 370/344 |
| 5,471,469 | A | * | 11/1995 | Flammer, III et al. | 370/346 |
| 5,583,870 | A | * | 12/1996 | Delprat et al. | 370/337 |
| 5,636,243 | A | * | 6/1997 | Tanaka | 375/219 |
| 5,684,806 | A | * | 11/1997 | Akiyama | 370/522 |
| 5,708,655 | A | * | 1/1998 | Toth et al. | 370/313 |
| 5,732,073 | A | * | 3/1998 | Kusaki et al. | 370/280 |
| 5,790,535 | A | * | 8/1998 | Kou | 370/337 |
| 5,793,762 | A | * | 8/1998 | Penners et al. | 370/389 |
| 5,881,061 | A | * | 3/1999 | Iizuka et al. | 370/337 |

FOREIGN PATENT DOCUMENTS

| EP | 0 483 546 | 5/1992 |
| WO | WO 96/33586 | 10/1996 |
| WO | WO 97/37504 | 10/1997 |

OTHER PUBLICATIONS

Kayama, et al., *Electronics and Communication in Japan*, "A Packet Channel Sharing Protocol for Microcellular Mobile Communications", pp. 1–9, 1996.

*GSM 03.64*, Version 1.2.0, "Digital Cellular Telecommunications System (Phase 2+); General Packet Radio Service (GPRS); Overall Description of the General Packet Radio Service (GPRS) Radio Interface: Stage 2", 1997.

A copy of the International Serach Report for PCT/Fi98/00272.

* cited by examiner

*Primary Examiner*—Kwang Bin Yao
(74) *Attorney, Agent, or Firm*—Squire, Sanders & Dempsey LLP

(57) ABSTRACT

The invention relates to a method of controlling packet transmission in conjunction with a packet radio service in a radio system comprising a base station and a number of subscriber terminals transmitting data to the base station in packet form using the same transmission channel, in said method the base station transmitting packet to the terminals, and said packets comprising data indicating to which terminal each packet is intended, actual data, and control data controlling the transmission of the terminals on the transmission channel. To enable the radio path resources to be used efficiently, when there is no actual data, the base station transmits packets comprising the control data of the transmission but no actual data to the terminals.

10 Claims, 1 Drawing Sheet

| USF | T | PC | HDR | DATA | BCS |

MAC HEADER / DATA BLOCK / BCS

PACKET TRANSMISSION IN MOBILE TELECOMMUNICATIONS SYSTEMS

FIELD OF THE INVENTION

The invention relates to a method of controlling packet transmission in conjunction with a packet radio service in a radio system comprising a base station and a number of subscriber terminals transmitting data to the base station in packet form using the same transmission channel, in said method the base station transmitting packets to the terminals and said packets comprising data indicating to which terminal each packet is intended, actual data, and control data controlling the transmission of the terminals on the transmission channel.

DESCRIPTION OF THE PRIOR ART

In conjunction with radio systems, packet radio services refer to a service employing packet switched technique known from fixed networks. Commercial radio systems used are commonly circuit-switched. Circuit switching is a method in which a connection is created between the users by allocating a predetermined amount of transmission capacity to the connection. During the entire connection, the transmission capacity is allocated exclusively to the connection. Packet switching is a method in which a connection is created between the users by transmitting data in packets comprising address and control data. Several connections can simultaneously employ the same transmission connection. The usage of packet switched radio systems particularly in transmitting data has been an object of research in recent years, since the packet switching method is well suited for data transmission required in software, in which the data to be transmitted is generated in bursts. In such a case the data transmission connection does not have to be reserved for the entire time, only for the packet transmission. Considerable savings in cost and capacity can be achieved by this, both when a network is being constructed and when it is being used.

Packet radio networks are presently particularly interesting when the GSM system is being developed further; reference is then made to the GPRS (General Packet Radio Service). The ETSI GSM specification proposal (ETSI GSM 03.64, Version 1.2.0, Mar. 3, 1997) describes the air interface in the GPRS between the network portion and the subscriber terminal.

In the GSM system, one physical channel is one time slot in a TDMA frame. The TDMA frame has eight time slots. According to the ETSI GSM 03.64 specification proposal, one or several physical channels, a PDCH (Packet Data Channel) which in practice is a traffic channel, are defined for setting up a packet radio connection and for packet transmission. Logical channels are located in the PDCH. The logical channels are divided into PCCCH channels (Packet Common Control Channel) and packet traffic channels. The packet traffic channels comprise PDTCH channels (Packet Data Traffic Channel) and PACCH channels (Packet Associated Control Channel). The PCCH channels comprise PRACH (Packet Random Access Channel) channels, PPCH (Packet Paging Channel) channels, PAGCH (Packet Access Grant Channel) channels and PBCCH (Packet Broadcast Control Channel) channels.

The system reserves resources from a radio path for different transmission directions asymmetrically, in other words independently of each other. In the uplink direction, in other words from a terminal to a base station, the radio path can be simultaneously employed by more than one terminal, and in such a case the terminals compete for the use of the channel. The system controls the use of the radio path in such a manner that the base station transmits data packets to the terminals, and these packets comprise data indicating to which terminal each packet is intended. The packets further comprise control data controlling the transmission of the terminals on the transmission channel.

Since the transmissions in different transmission directions are independent of each other, a situation may easily arise in which a terminal has something to be transmitted, but the base station has no data to be transmitted to the terminals. In a prior art solution the terminals cannot, however, transmit since they are not receiving data from the base station indicating the user of the radio path. In such a case, the terminals are compelled to wait for the base station to transmit data to a terminal. Radio path resources are thus used rather inefficiently at the moment.

BRIEF DESCRIPTION OF THE INVENTION

An object of the present invention is therefore to provide a method by means of which the radio path resources can be utilized more efficiently than before.

This is achieved by the method of the type described in the introduction, the method being characterized in that when there is no actual data, a base station transmits packets comprising control data of the transmission but no actual data to the terminals.

The method of the invention has several advantages. By means of the invention the traffic in different transmission directions can be controlled independently of whether a base station has data to be transmitted to the terminals. Uplink capacity can thus be substantially increased.

BRIEF DESCRIPTION OF THE DRAWINGS

The invention will be described in closer detail in the following with reference to the examples in accordance with the accompanying drawings, in which.

DETAILED DESCRIPTION OF THE INVENTION

Figure 1:
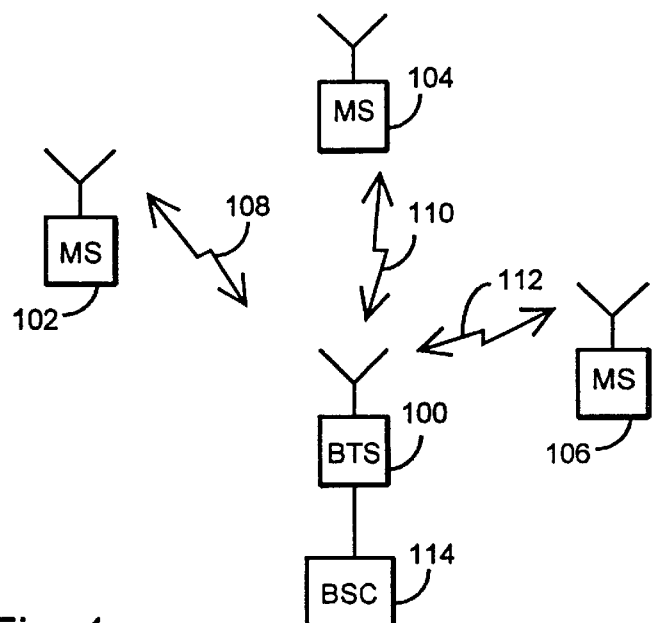
FIG. 1 illustrates a system to which the method of the invention can be applied.

Let us first view FIG. 1 illustrating a radio system in which the method of the invention can be employed. The radio system comprises at least one base station 100 communicating with subscriber terminals 102 to 106 in its area. A base station controller 114 in turn controls the operation of one or several base stations. In radio systems, the speech and data traffic of a user are transmitted between a base station and a subscriber terminal using traffic channels. Furthermore, various control messages and system data transmitted on control channels are required between the base station and the subscriber terminal. The solution of the invention will be described in the following when it is applied to the GSM system without restricting it to the GSM system, however.

Figure 2:
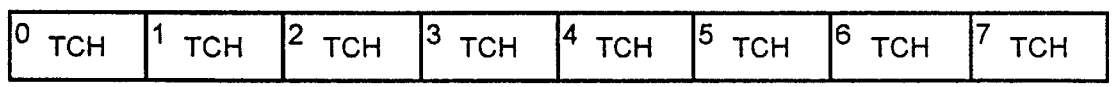
FIG. 2 shows a typical structure of a GSM time division frame.

FIG. 2 shows the typical structure of a GSM frame. The GSM frame comprises eight time slots, numbered 0 to 7. A base station transmits typically several carrier wave frequencies, each having in its use a frame comprising eight time slots. A corresponding frame is in use, of course, in the opposite transmission direction.

In this example, let us assume that the terminals 102 and 104 of the subscriber terminals in FIG. 1 use a packet switched connection and the terminal 106 is in a normal circuit switched connection 112 to the base station 100. The base station 100 transmits a frame according to FIG. 2 at a given frequency. Let us assume that to the terminal equipment 106 is allocated time slot 4 for a circuit switched connection, for instance for a normal telephone call. Let us further assume that time slot 1 is reserved for packet form traffic, in other words this time slot is used to create a PDCH (Packet Data Channel) channel by which the packets of all terminals using a packet switched connection are transmitted. The traffic 108, 110 between the terminals 102, 104 and the base station 100 thus passes in this time slot.

The terminals 102 and 104 thus transmit their data packets to the base station 100 using the same transmission channel. In such a case a control system is needed, of course, by means of which the channel can be divided in a controlled manner between several terminals using the same channel. In the method of the invention, this control is performed by the base station in such a manner that the packets transmitted to the terminals by the base station comprise control data by means of which the terminals can detect whose turn it is at a particular time to transmit data to the base station.

Figure 3:
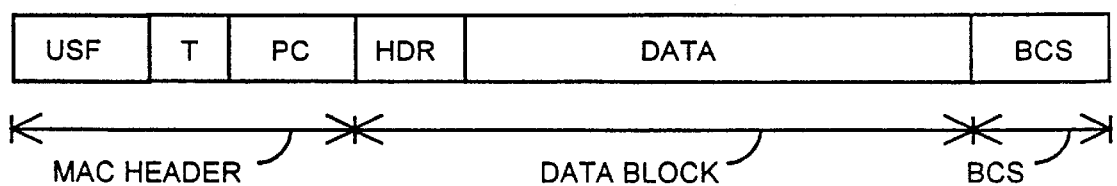
FIG. 3 illustrates the structure of a typical packet transmitted by a base station.

FIG. 3 illustrates the structure of a typical packet transmitted by a base station. The packet comprises three main fields: a MAC (Medium Access Control) header, a data field and a BCS (Block Check Sequence) field. The MAC header comprises three components: an USF (Uplink State Flag) indicating an uplink state to the terminal, in other words which terminal is allowed next to transmit data to the base station using the common transmission channel. T is a Block Type Indicator and PC is data related to power regulation. These fields are not essential to the invention, which is why they are not discussed here in closer detail. The same applies to the BCS field associated with a physical link layer.

A data block in turn comprises two parts. The first part is a so called RLC header (Radio Link Control header), in which so called Temporary Frame Identity (TFI) data is transmitted, on the basis of which the terminals can identify to which terminal the data of a packet is intended. The data is included in the latter part of the data field.

The above structure and the different parts of the packet are described in closer detail in the ETSI document GSM 03.64 Version 1.20 which is incorporated herein by reference. A transmission unit is thus termed a packet in the present application. A packet radio service can be part of a more extensive packet transmission network. The packet of the application can in such a case be a partial packet or a section of the total packet of the packet transmission network, which is divided into several partial packets or sections for the transmission taking place on a radio path. An example of a more extensive packet transmission network is the Internet.

When a base station has data intended to a terminal, the base station transmits the data employing the packets described above. The TFI data of the packet indicates to which terminal the packet is intended and the USF field in the packet indicates which terminal is allowed to transmit in the uplink direction at a particular time.

In the solution of the invention, when there is no actual data, a base station transmits to terminals packets comprising control data of the transmission but no actual data. In these packets, the data field thus does not comprise data intended to a terminal, but there is either an arbitrary bit sequence or a predetermined bit sequence in place of data. The packets thus comprise the USF field, however, comprising data indicating which terminal is allowed to transmit in the uplink direction.

In order to prevent the terminal from trying to identify a data field not comprising meaningful data, the packets in the solution of the invention comprise data indicating that the packet does not comprise data to be transmitted to the terminals. This is implemented by means of the TFI data. To the TFI bits is chosen a combination which does not indicate any terminal using the connection. Each terminal thus receives a transmitted packet, identifies from it the USF field and the information in it on the uplink usage, identifies the TFI data and on the basis of it recognizes that the packet comprises no actual data intended to it.

The method of the invention can therefore be preferably applied in conjunction with the GPRS packet radio service, but it can also be applied to other services in which the uplink control is performed by data packets transmitted by a base station.

Even though the invention has been described in the above with reference to the example in accordance with the accompanying drawings, it is to be understood that the invention is not restricted to it, but can be modified in many ways within the scope of the inventive idea disclosed in the appended claims.

What is claimed is:

1. A method of controlling packet transmission in conjunction with a packet radio service in a cellular radio system, the method comprising:

transmitting data to a base station in packet form using a common transmission channel from a number of subscriber terminals, the transmission channel supporting packet transmission in different directions on different carrier frequencies;

transmitting packets to the terminals from the base station via the transmission channel, the transmission channel utilizing a frame structure comprising time slots, every time slot of a frame can be used in transmitting packet data to the terminals, the packets comprising:

a field reserved for data that indicates for which terminal the packets are intended;

a field reserved for control data that controls transmission on the transmission channel; and a field reserved for actual data when there is actual data to be transmitted, but when there is no actual data to be transmitted in the field reserved for actual data, the base station transmits packets comprising:

control data in the field reserved for transmission control data;

predetermined data in the field reserved for data that indicates for which terminal the packets are intended, the predetermined data indicates that the packets being transmitted are not intended for any of the terminals; and no actual data is transmitted in the field reserved for actual data.

2. The method of claim 1, further comprising transmitting packets using every time slot of each frame.

3. The method of claim 1, further comprising transmitting packets using at least one time slot of each frame.

4. A method of controlling packet transmission in conjunction with a packet radio service in a cellular radio system, the method comprising:

transmitting data to a base station in packet form using a common transmission channel from a number of subscriber terminals; and transmitting packets to the terminals from the base station; the packets comprising:
- a field reserved for data that indicates for which terminal the packets are intended;
- a field reserved for control data that controls transmission on the transmission channel; and
- a field reserved for actual data when there is actual data to be transmitted; but when there is no actual data to be transmitted in the field reserved for actual data, the base station transmits packets comprising:
  - control data in the field reserved for transmission control data;
  - predetermined data in the field reserved for data that indicates for which terminal the packets are intended, the predetermined data indicates that the packets being transmitted are not intended for any of the terminals; and
- no actual data is transmitted in the field reserved for actual data.

5. The method of claim 4, further comprising transmitting data indicating that the packets contain no actual data.

6. The method of claim 4, wherein the packets being similar in structure to conventional data packets, and that an arbitrary bit sequence is transmitted in the field reserved for actual data.

7. The method of claim 4, wherein the packets being similar in structure to conventional data packets, and that a predetermined bit sequence is transmitted in the field reserved for actual data.

8. The method of claim 4, wherein the packet radio service is a General Packet Radio Service.

9. The method of claim 4, further comprising:

transmitting packets to the terminals from the base station via the transmission channel utilizing a frame structure comprising time slots;

transmitting packet data in every time slot of a frame; and transmitting packets using every time slot of every frame.

10. The method of claim 4, further comprising:

transmitting packets to the terminals from the base station via the transmission channel utilizing a frame structure comprising time slots, transmitting packet data in every time slot of a frame; and transmitting packets using at least one time slot of each frame.

* * * * *